April 20, 1954   M. ERNST   2,675,643
ANIMATED WHEELED FIGURE TOY
Filed March 16, 1951
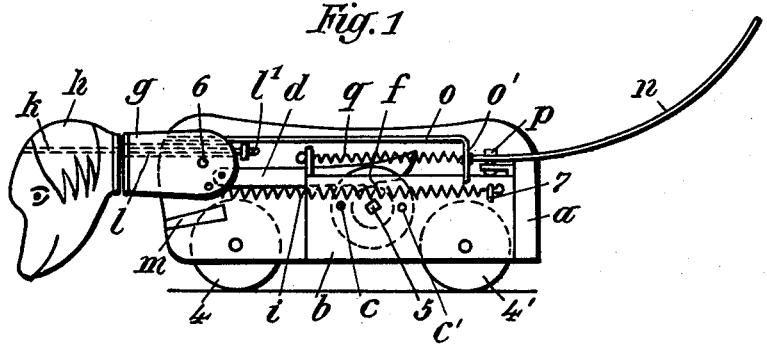
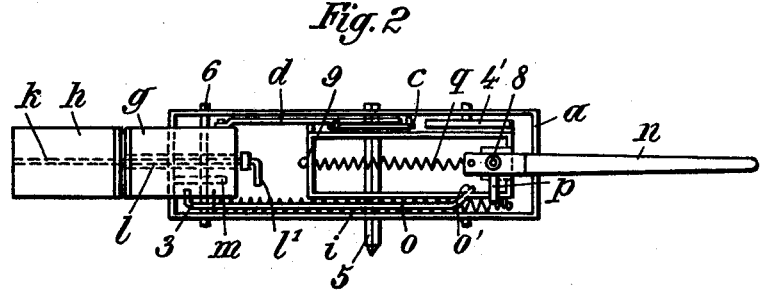
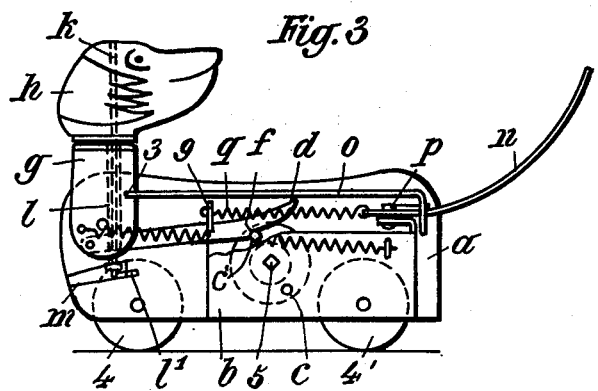
Inventor:
Max Ernst
By
Bryant + Lowry
Attorneys Patented Apr. 20, 1954

2,675,643

UNITED STATES PATENT OFFICE 2,675,643

ANIMATED WHEELED FIGURE TOY

Max Ernst, Nurnberg, Germany

Application March 16, 1951, Serial No. 215,898

3 Claims. (Cl. 46—104)

My invention relates to wheeled animal figure toys and more especially to structural improvements in self propelled quadrupedal animal figure toys having a body on wheels with the head and tail projecting therefrom at its front and rear ends.

The principal object of the invention is to provide a redesigned animal figure toy of the type concerned, e. g. in the form of a dog, which while running will periodically swing its neck upwardly with respect to its body and while the neck is so elevated the head will be rotated to look rearwardly while the tail will wag laterally.

Another object of the invention is to cause the toy dog to turn its head backwardly, while running, as in looking in a joyful mood at its master.

With these and other objects in view the animal figure toy has been redesigned, as described in the following specification and as shown diagrammatically and by way of example in the accompanying drawing, wherein Fig. 1 is a side elevation, partly in section, of an animal figure toy in the form of a dog, Fig. 2 is a plan of the toy partly in section, Fig. 3 is another side elevation, partly in section, with the dog's neck and head, in a characteristic uprighted and turned back position.

The redesigned animal toy has a housing $a$ on wheels 4, 4' formed as a quadrupedal animal's body, e. g. of a dog, wherein a clock work $b$, having a rotary winding shaft 5, for driving the wheels, is enclosed. The dog's neck $g$ with a head $h$ attached, is pivotally fixed at 6 in the housing, so as to be reciprocatively swung up and down. Neck actuating means is provided which cooperatively interconnect the dog's neck, body and the clock work therein, and which comprise a helical spring $i$ under tension, fixed in the housing at 7 and loading the neck $g$ at its lower end, a push bar $d$ hinged thereon, and having a recessed rear end $f$, and a studded rotary disk $c$, $c'$, fixed on the clock work's winding shaft 5, so as to periodically engage and push ahead the push bar $d$ and upright the neck $g$.

A special attractive feature of the invention consists therein, that the toy dog's head $h$ is revolvingly mounted on the neck $g$, for being reciprocatively turned around as though joyfully looking at its master, while the neck is swung up and down.

Actuating means are provided for this purpose which comprise a rotary shaft or pin $k$, journalled in a tubular holder $l$ of the neck, extending longitudinally therethrough and carrying the dog's head in an excentric position. A lever or crank $l'$ is formed on the pin $k$ crosswisely projecting therefrom at its lower end, and an abutment member $m$ is fixed in the housing $a$, adapted to swing around said lever $l'$ and turn backward the dog's head, while the neck is uprighted by the mechanism described herein before, viz. push bar $d$ and studded rotary disk $c$, $c'$.

It will be understood that whenever the studs $c$, $c'$ become disengaged and the push bar $d$ is released, the dog's neck will be lowered by the spring $i$ and its head $h$ will gravitationally return in its natural position shown in Fig. 1.

A supplemental cheerful feature of the invention is the wagging of the dog's tail, while its head $h$ is raised and turned back in the direction to its master.

The dog's tail $n$ is pivotally fixed at 8 in the housing $a$, slotted at its rear end, so as to be swung aside and is loaded by a spring $q$ fixed in the housing $a$ at 9 and at the tails inner end.

Another push bar $o$, hooked at $o'$, is hinged at 3 in the neck's upper section so as to engage and turn around an actuating lever $p$ crosswisely attached at the dog's tail $n$, when the neck is uprighted. On releasing the actuating lever $p$ the tail is returned by the spring $q$ into its normal position. Various structural changes and modifications may be conveniently made in the mechanism shown and described for actuating head, neck and tail of quadrupedal animal figure toys without substantially departing from the spirit and the salient ideas of this invention.

What I claim is:

1. In a wheeled animal figure toy, the combination with a housing on wheels, formed as a quadrupedal animal's body, of a clock work enclosed therein for driving the wheels, a winding shaft for the clock work, an animal's neck having a head attached and being pivotally mounted in the housing on an axis extending transversely of the housing, and means for pivotally moving the neck upwardly and downwardly on its pivot comprising a helical spring under tension fixed in the housing and loading the neck at its lower end, a push bar hinged on the neck and having a recessed rear end and a rotary disk having circumferentially spaced lateral studs fixed on the winding shaft with the studs periodically engaging the recessed end of the push bar to move the push bar forwardly to swing the neck upwardly on its pivot against spring tension thereon for elevating the neck.

2. In a wheeled animal figure toy, the combination with a housing on wheels, formed as a quadrupedal animal's body, of a clock work enclosed therein for driving the wheels, a winding shaft for the clock work, an animal's neck having a head revolvingly mounted thereon, said neck being pivotally mounted in the housing so as to be pivotally swung upwardly and downwardly while the head is turned around and backwardly, and actuating means cooperatively interconnecting the animal's neck and head with the clock work therein comprising a spring under tension fixed in the housing and loading the neck at the inner end thereof below its pivot, a push bar hinged in the neck below the pivot, a rotary disk having circumferentially spaced lateral studs mounted on the winding shaft with the studs periodically engaging and moving the push bar forwardly to elevate the neck, a rotary shaft longitudinally journaled in the neck and carrying the animal's head at its upper end, a crank formed on the neck shaft and crosswisely projecting from the lower end thereof, and an abutment member in the housing adapted to throw back said crank and rotate the neck shaft and the animal's head while the neck is elevated.

3. In a wheeled animal figure toy, the combination with a housing on wheels, formed as a quadrupedal animal's body, of a clock work enclosed therein for driving the wheels, a winding shaft for the clock work, an animal's neck having a head revolvingly mounted thereon, said neck being pivotally mounted in the housing so as to be vertically swung upwardly and downwardly while the head is turned around, and an animal's tail pivotally mounted in the housing so as to be swung laterally relatively to the animal's body, said tail having a crank crosswisely projecting therefrom, and actuating means cooperatively interconnecting the animal's neck, head and tail with the clock work in the housing and comprising a spring under tension fixed in the housing and loading the neck, a push bar pivotally attached at its forward end to the neck, a rotary disk having circumferentially spaced lateral studs mounted on the winding shaft with the studs periodically engaging and moving said push bar forwardly to elevate the neck, a rotary shaft longitudinally journaled in the neck and carrying the animal's head at its upper end, a crank crosswisely projecting from the lower end of the neck shaft, and an abutment in the housing adapted to throw back said crank and turn around the shaft and animal's head while the neck is elevated, a spring fixed in the housing loading the tail and another push bar pivotally mounted on the upper portion of the neck and engaging the actuating crank on the tail while the neck is elevated.

References Cited in the file of this patent

UNITED STATES PATENTS

| Number | Name | Date |
| --- | --- | --- |
| 1,353,707 | Barnard | Sept. 21, 1920 |
| 1,561,374 | Sweet | Nov. 10, 1925 |
| 1,604,663 | Savage | Oct. 26, 1926 |
| 1,695,475 | Vautrin | Dec. 18, 1928 |